United States Patent [19]

Reuteler

[11] Patent Number: 5,183,146
[45] Date of Patent: Feb. 2, 1993

[54] VIAL OR AMPOULE INFEED CONVEYOR MECHANISM

[75] Inventor: Urs Reuteler, Lebanon, N.H.

[73] Assignee: New Jersey Machine Inc., Lebanon, N.H.

[21] Appl. No.: 838,135

[22] Filed: Feb. 18, 1992

[51] Int. Cl.[5] .............................................. B65G 47/12
[52] U.S. Cl. ................................... 198/444; 198/454; 198/461; 198/467.1
[58] Field of Search ............... 198/443, 444, 453, 454, 198/461, 467.1, 434, 440, 441, 657, 433, 448

[56] References Cited

U.S. PATENT DOCUMENTS

| 1,850,480 | 3/1932 | Sledge et al. | 198/608 X |
|---|---|---|---|
| 1,977,893 | 10/1934 | Oslund | 198/608 X |
| 1,998,093 | 4/1935 | Oslund | 198/608 X |
| 2,493,464 | 1/1950 | Nelson | 198/454 |
| 2,600,726 | 6/1952 | Behrens | 198/443 |
| 2,787,358 | 4/1957 | Cox | 198/453 |
| 3,315,782 | 4/1967 | Eldred | 198/444 |
| 4,660,708 | 8/1987 | Willerding | 198/467.1 X |
| 4,898,271 | 2/1990 | Schiessl | 198/444 |
| 5,050,725 | 9/1991 | Newell et al. | 198/444 |

FOREIGN PATENT DOCUMENTS

| 316393 | 7/1914 | Fed. Rep. of Germany | 198/454 |
|---|---|---|---|
| 3637250 | 6/1987 | Fed. Rep. of Germany | 198/454 |
| 0140409 | 6/1986 | Japan | 198/454 |
| 0066015 | 3/1990 | Japan | 198/443 |
| 0075525 | 3/1990 | Japan | 198/443 |
| 0595228 | 2/1978 | U.S.S.R. | 198/454 |

*Primary Examiner*—D. Glenn Dayoan
*Attorney, Agent, or Firm*—Charles E. Baxley

[57] ABSTRACT

An infeed mechanism for delivering vials to be labeled to an infeed conveyor of a labeling machine and then to a timing screw of the labeling machine includes a vial separating screw having a vial exit end, a vial infeed belt for supporting and moving vials along a relatively wide path toward the vial separating screw and placing the vials in engagement with the vial separating screw. A pair of spaced vial guides define a relatively narrow vial path therebetween and aligned with the vial exit end of the vial separating screw which is rotated to deliver vials single file into the relatively narrow path between the vial guides and then onto the infeed conveyor of the labeling machine and on into engagement with the labeling machine timing screw.

12 Claims, 1 Drawing Sheet

VIAL OR AMPOULE INFEED CONVEYOR MECHANISM

BACKGROUND OF THE INVENTION

This invention relates to a vial or ampoule infeed conveyor mechanism and more particularly to such mechanism for taking vials, ampoules or other small diameter fragile containers from a batch supply, such as on a tray, and feeding them into a labeling machine in single file. As used herein, "vial" or "vials" is to be construed broadly enough to include "ampoule" or "ampoules."

Still more particularly, the infeed mechanism and conveyor according to the invention can be bolted to the side of an existing labeling machine, already installed and in-line with processing machinery, such as fillers and cappers. Because of its unique self-contained features and guiding means, this invention expands the use of existing labeling machines.

In high speed labeling machines, it is desirable, in general, and essential in a continuously operating labeler, to present an uninterrupted product flow. Due to the velocity of the product entering the infeed timing screw, it is essential to maintain a backlog of product to obtain sufficient back pressure forcing the product into the entrance pocket of the labeling machine timing screw efficiently, i.e. securely and completely. Special problems exist where the product is vials or ampoules which must be prevented from toppling over and possibly breaking or jamming the infeed operation. Product toppling can be prevented with a virtually choked infeed conveyor mechanism. However, to prevent breakage of vials or ampoules, the system cannot be completely loaded. The present invention addresses and solves these problems.

It is accordingly an important object of the present invention to provide a vial or ampoule infeed conveyor mechanism that is capable of ready attachment to an existing high speed labeling machine having an infeed conveyor and an infeed timing screw.

It is another important object of the present invention to provide such a vial or ampoule infeed conveyor mechanism that will maintain a backlog of product (vials or ampoules) to attain sufficient back pressure forcing product into the entrance pocket of the labeling machine timing screw efficiently, i.e. securely and completely.

It is a further important object of the invention to provide such a vial or ampoule infeed conveyor mechanism that will prevent vials or ampoules from toppling over, thus to prevent vial and/or product breakage and jamming of the infeed operation.

It is a still further important object of the invention to provide such an infeed conveyor mechanism that will be virtually choked, but not completely loaded with product.

It is yet another important object of the invention to provide such an infeed conveyor mechanism that is relatively simple and inexpensive but will nevertheless function efficiently and continuously at high rates of speed.

The foregoing and additional objects and advantages will appear hereinafter.

SUMMARY OF THE INVENTION

The instant invention presents an infeed mechanism for delivering vials to be labeled to an infeed conveyor of a labeling machine and thence to a timing screw of the labeling machine for delivery to a labeling station of the labeling machine.

The inventive infeed mechanism comprises a vial separating screw having a vial exit end, and a vial infeed belt for supporting and moving vials along a relatively wide path toward the vial separating screw and placing vials in engagement with the vial separating screw. The infeed mechanism further comprises a pair of spaced vial guides defining a relatively narrow path therebetween aligned with the exit end of the vial separating screw, which is rotated to deliver vials single file into the relatively narrow path between the vial guides and thence onto the infeed conveyor of the labeling machine and on into engagement with the timing screw of the labeling machine for delivery to the labeling station of the labeling machine.

The relatively narrow vial path extending from the vial separating screw to the infeed conveyor of the labeling machine is U-shaped, whereby the vial guides reverse the direction of vial movement.

The spacing between the vial guides is adjustable, and the infeed mechanism further comprises vial retaining guides on opposite sides of the vial infeed belt, an infeed wedge and a vibratory agitator block mounted on opposite edges of the vial infeed belt adjacent the vial separating screw to facilitate delivery of vials into engagement with the vial separating screw.

The vial separating screw is replaceable to accommodate vials of differing diameters.

A motor is provided for driving the vial infeed belt and a pair of sensors are in predetermined position relative to the vial infeed belt to start and stop the motor depending on the magnitude of the supply of vials on the infeed belt adjacent the vial separating screw.

The infeed mechanism also includes a clutch through which the vial separating screw is driven from a line shaft of the labeling machine. When the supply of vials at the entrance to the infeed timing screw becomes depleted, the clutch engages and thereby starts rotation of the vial separating screw to supply vials to the infeed timing screw of the labeling machine, and an oversupply of vials results in a signal to the clutch to disengage, thereby interrupting the supply of vials.

The ratio of rotation between the infeed timing screw of the labeling machine and the vial separating screw is preselected so that slightly more vials are supplied by the vial separating screw than can be taken away by the infeed timing screw of the labeling machine, thus to insure an ample supply of vials, even if empty pockets develop at the discharge end of the vial separating screw.

DESCRIPTION OF THE INVENTION

Figure 1:
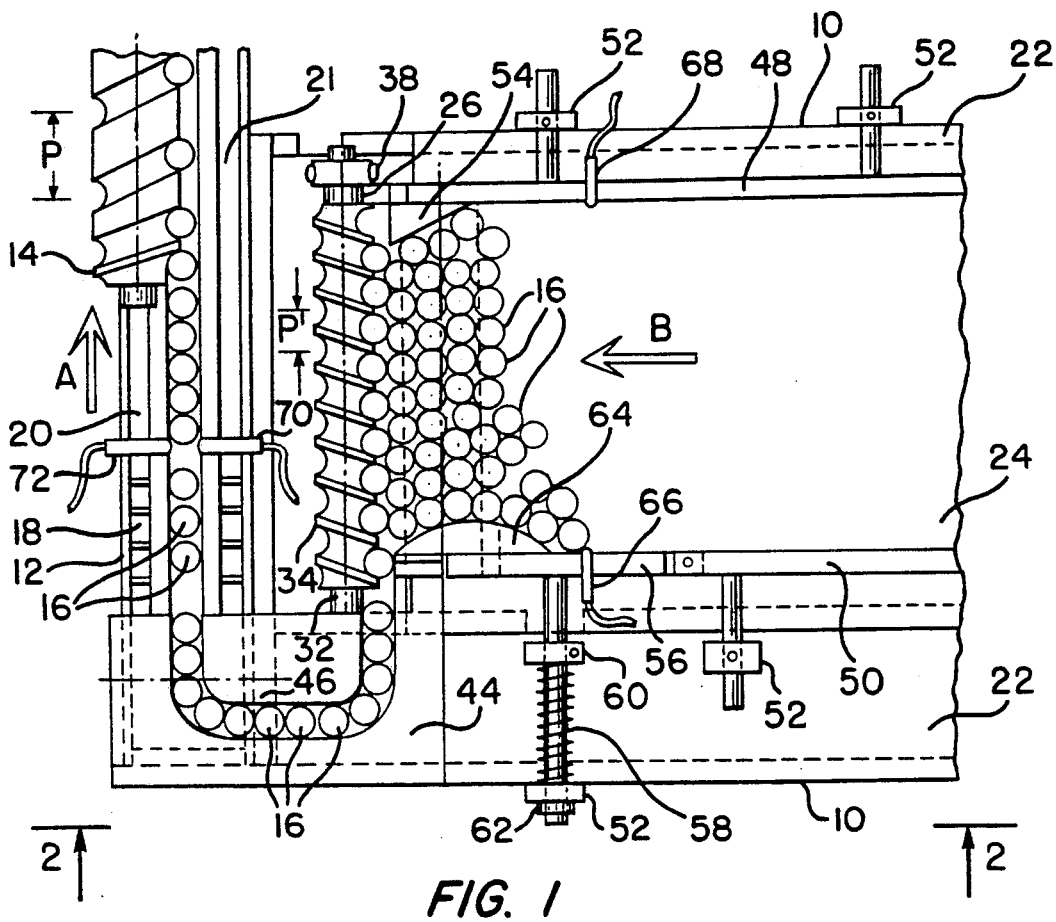
FIG. 1 is a fragmentary plan view of a preferred infeed conveyor according to the invention.
Figure 2:
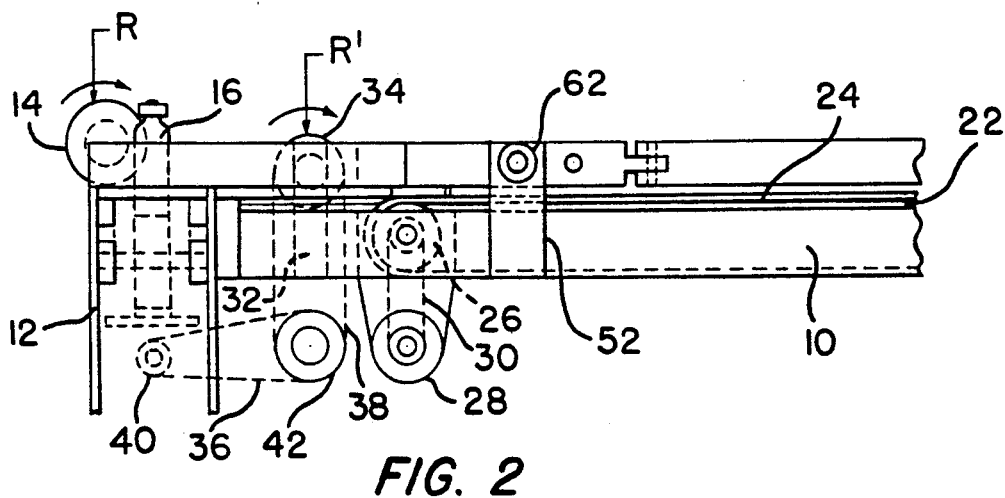
FIG. 2 is a view taken substantially on line 2—2 of FIG. 1.

In FIGS. 1 and 2 a support frame 10 is fastened by conventional means to the infeed conveyor 12 of a labeling machine which is not shown in its entirety. An infeed timing screw 14 is part of the labeling machine with a pitch P as required by the labeling machine characteristic. Vials 16 are carried by the machine conveyor chain or belt 18 in single file, in the direction of arrow A, toward a label applying station (not shown), guided by conveyor guides 20 and 21 which are adjustably supported by the conveyor sides in known manner.

A vial infeed table 22 is fastened to the support frame 10 and provides a support surface for a vial infeed belt 24 which is driven in the direction of arrow B by the drive roller 26. Drive roller 26 is rotatably mounted in support frame 10 with bearings of known construction and driven by a motor 28 via belt 30 and associated pulleys. The motor 28 is also mounted to and supported by the support frame 10. The other end of the vial infeed belt 24 is supported and guided by an idler roller (not shown) mounted in known manner to the support frame 10.

Also fastened to the support frame 10 are separating screw bearing blocks 32 rotatably supporting vial separating screw 34 with a pitch of $P^1$. Separating screw 34 is driven via belts 36, 38 and associated pulleys (as required) from the labeler line shaft 40 through a clutch 42.

Vial guides 44, 46 are changeable parts made for each specific diameter of vials 16 and fastened to support frame 10. They are used to direct the vials 16 from the discharge end of the vial separating screw 34 to the infeed conveyor 18 of the labeling machine. Depending on the mounting of vial infeed table 22 and associated equipment, these guides 44, 46 need not be U-shaped but are the required shape to bridge the gap between the vial separating screw 34 and the infeed conveyor 18.

Product retaining guides 48, 50 are adjustably mounted in guide supports 52 which in turn are fastened to the support frame 10. Infeed wedge 54 aids in feeding the vials 16 into separating screw 34.

The forward end of guide 56 (next to the separating screw discharge) of the product retaining guide 50 is pivotally mounted to the product retaining guide 50 and is spring loaded into the operating position with spring 58 and collar 60 and positioned with retaining collar 62. Mounted to the forward end of guide 56 is an agitator block 64. During operation, agitator block 64 vibrates and helps to prevent vials 16 from interlocking and not entering the separating screw 34. To insure sufficient pressure to force vials 16 into the separating screw pockets, a pair of sensors 66, 68 are placed at the appropriate position on the vial infeed belt 24. These sensors 66, 68 control (start and stop as required) the motor 28, which through means described above, moves vial infeed belt 24 in the direction of arrow B feeding vials 16 into the vial separating screw 34. Another pair of sensors 70, 72 are mounted on the labeling machine infeed conveyor 12 to control the supply of vials 16 at the entrance to the infeed timing screw 14.

When the supply of vials 16 becomes depleted, clutch 42 engages and thereby starts rotation of the separating screw 34 supplying vials 16 to the infeed conveyor 18. Conversely an oversupply of vials 16 causes the sensors 70, 72 to signal clutch 42 to disengage, thereby interrupting the supply of vials 16.

Infeed timing screw 14 has a speed of rotation of R in the clockwise direction as indicated by an arrow applied to screw 14 in FIG. 2, while separating screw 34 has a speed of rotation of R' in the clockwise direction as indicated by an arrow applied thereto in FIG. 2.

It should be noted that the ratio of rotation R of screw 14 to the speed of rotation R' of screw 34 is preselected, such that slightly more vials 16 are supplied by the separating screw 34 than can be taken away by the infeed timing screw 14 to insure an ample supply of vials 16, even if some spaces should develop at the discharge end of the separating screw 34 (i.e., if empty pockets develop).

It is apparent that the invention achieves the aforementioned objects and advantages among others. The disclosed details are exemplary only and are not to be taken as limitations on the invention except as those details may be included in the appended claims.

What is claimed is:

1. For delivering vials to be labeled to an infeed conveyor of a labeling machine and thence to a timing screw of the labeling machine, an infeed mechanism comprising a vial separating screw having a vial exit end, a vial infeed belt for supporting and moving vials along a relatively wide path toward said vial separating screw and placing vials in engagement with said vial separating screw, a pair of spaced vial guides defining a relatively narrow vial path therebetween, and means for rotating said vial separating screw to deliver vials single file into said relatively narrow path between said vial guides and thence onto the infeed conveyor of the labeling machine and on into engagement with the timing screw of the labeling machine.

2. An infeed mechanism according to claim 1 further comprising a support frame whereby said infeed mechanism is fastenable to the labeling machine.

3. An infeed mechanism according to claim 1 wherein said vial path defined by said vial guides is U-shaped, whereby said vial guides reverse the direction of vial movement.

4. An infeed mechanism according to claim 1 wherein the spacing between said vial guides is adjustable.

5. An infeed mechanism according to claim 1 further comprising vial retaining guides on opposite sides of said vial infeed belt, an infeed wedge and a vibratory agitator block mounted on opposite edges of said vial infeed belt adjacent said vial separating .screw to facilitate delivery of vials into engagement with said vial separating screw.

6. An infeed mechanism according to claim 1 wherein said vial separating screw is replaceable to accommodate vials of differing diameters.

7. An infeed mechanism according to claim 1 further comprising a motor for moving said vial infeed belt and a pair of sensors in predetermined position relative to said vial infeed belt to start and stop said motor depending on the magnitude of the supply of vials on said infeed belt adjacent said vial separating screw.

8. An infeed mechanism according to claim 1 further comprising a clutch and wherein said vial separating screw is driven from a line shaft of the labeling machine through said clutch.

9. An infeed mechanism according to claim 8 further comprising sensor means whereby when the supply of vials at the entrance to the infeed timing screw becomes depleted, said sensor means signals said clutch to engage thereby starting rotation of said vial separating screw to supply vials to the infeed timing screw, and when there is an oversupply of vials said sensor means signals said clutch to disengage, thereby interrupting the supply of vials.

10. An infeed mechanism according to claim 1 wherein the ratio of rotation between the infeed timing screw of labeling machine and said vial separating screw is preselected so that slightly more vials are supplied by said vial separating screw than can be taken away by the infeed timing screw to insure an ample supply of vials, even if empty pockets develop at the discharge end of said vial separating screw.

11. For delivering vials to a labeling machine, an infeed mechanism comprising at rotatable vial separating screw having a vial exit end an a horizontal axis, a vial infeed belt for supporting and moving vials in bulk from a batch supply of vials along a horizontal path perpendicular to said axis and toward and into engagement with said separating screw that extends completely across said path, and constricting means for narrowing said path along opposite side edges of said vial infeed belt adjacent said vial separating screw, wherein said vial separating screw has a predetermined pitch and the width of said path adjacent said vial separating screw is at least several times said pitch.

12. An infeed mechanism according to claim 11 wherein said constricting means include a vibratory agitator block at the edge of said vial infeed belt adjacent said vial exit end of said vial separating screw and an infeed wedge at the other edge of said vial infeed belt.

* * * * *